Feb. 23, 1971     OLE-BENDT RASMUSSEN     3,565,744
EXTRUDED POLYMERIC SHEET MATERIAL
Filed Dec. 29, 1967                           5 Sheets-Sheet 1

INVENTOR

Ole-Bendt Rasmussen

BY

Watson, Cole, Grindle + Watson

ATTORNEY

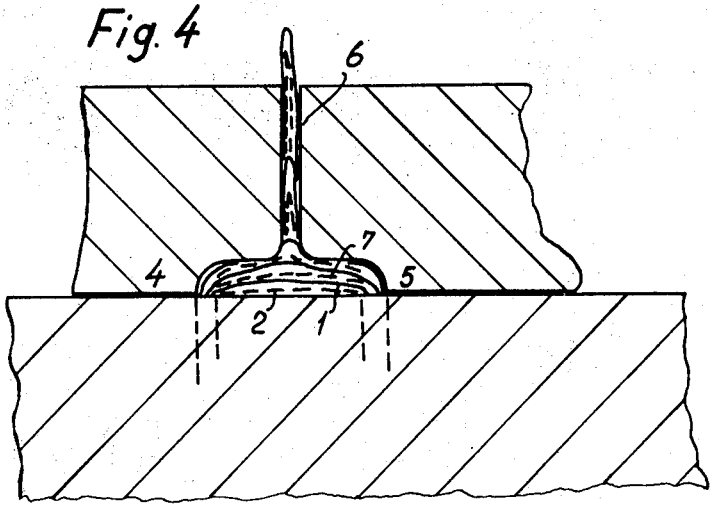
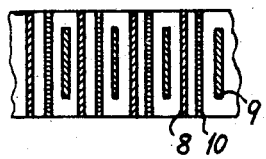
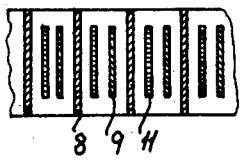
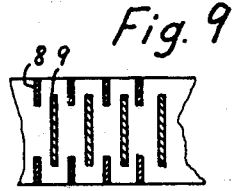
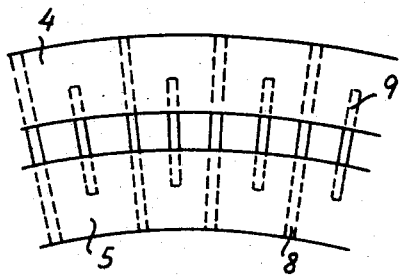
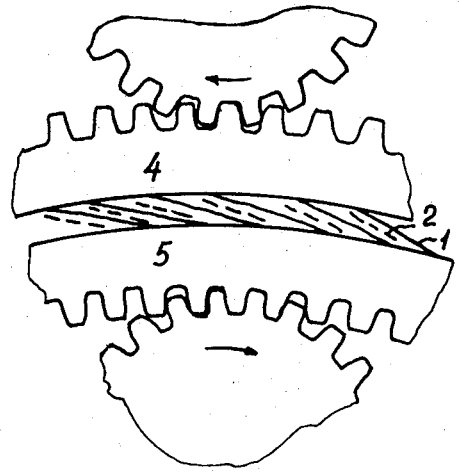

Feb. 23, 1971    OLE-BENDT RASMUSSEN    3,565,744
EXTRUDED POLYMERIC SHEET MATERIAL
Filed Dec. 29, 1967    5 Sheets-Sheet 5
Fig. 12    Fig. 11
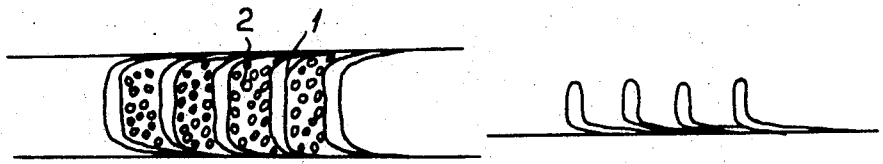
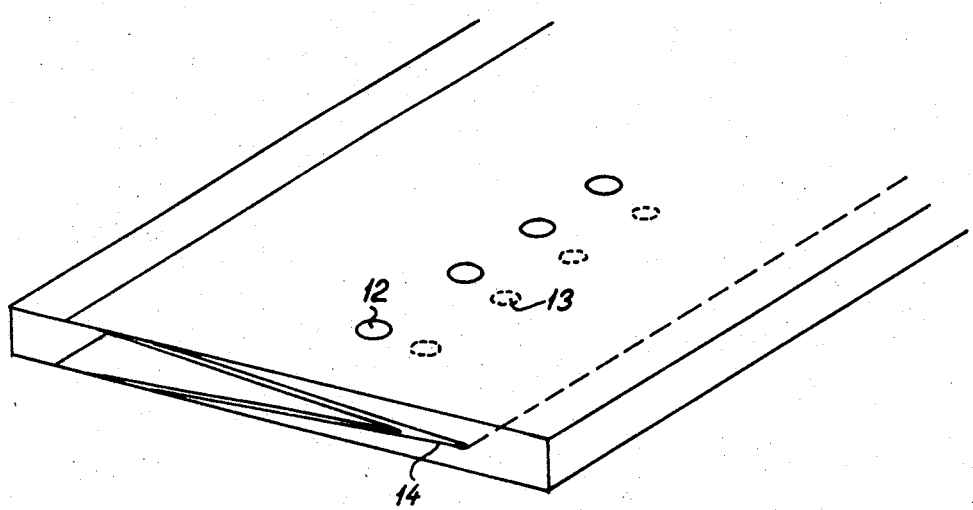
Fig. 10
INVENTOR
Ole-Bendt Rasmussen
BY
Watson, Cole, Grindle & Watson
ATTORNEY United States Patent Office 3,565,744
Patented Feb. 23, 1971

3,565,744
EXTRUDED POLYMERIC SHEET MATERIAL
Ole-Bendt Rasmussen, 7 Topstykket,
3460 Birkerod, Denmark
Filed Dec. 29, 1967, Ser. No. 694,439
Claims priority, application Great Britain, Dec. 30, 1966,
58,429/66
Int. Cl. B32b 3/00
U.S. Cl. 161—112                                    18 Claims

ABSTRACT OF THE DISCLOSURE

An extruded sheet material is composed of lamellae of a strong polymeric material that extend through the body of the sheet and at least at one end are fused together in overlapping relationship to form a skin. A less strong, preferably foamed material may be provided in the cavities between the lamellae of the skin to obtain desired properties.

Figure 1:
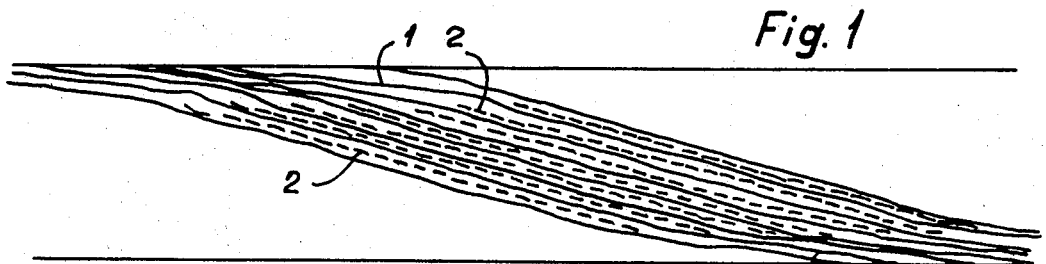

The sheet is made by extruding a multitude of interspersed flows of different cross-section of the two materials through rotating die parts.

BACKGROUND OF THE INVENTION

This invention relates to sheet materials that are made by extrusion in sheet form and which have a disrupted structure in a portion generally being the central part.

In referring to a disrupted structure I mean any structure which is other than continuous.

Sheet materials having a continuous structure can generally be made satisfactorily by extrusion. However, when it is desired to obtain a sheet material having a disrupted structure either directly by extrusion or by disruption of an extruded sheet material having a continuous structure satisfactory results generally are not obtained. The problems that arise depend upon the particular type of disruption that is conducted, but generally they result in the disrupted sheet material being weaker than would be desirable. For example, foamed polystyrene can be extruded in sheet form but the sheet material, when thin, has very low strength and can readily be torn, and, whatever its thickness, is very prone to surface damage and to compression perpendicular to its surface.

It is possible to laminate a disrupted sheet material, such as foamed polystyrene, against an undisrupted layer, and while this is satisfactory in some instances it is not always satisfactory. For one reason, it is not always easy or possible to obtain a satisfactory bond between the continuous structure and the disrupted structure. For another reason, if sheet materials are to be laminated together they must necessarily have a considerable thickness, and so when the laminated product is formed it of necessity must be rather thick.

It has been my object to produce a sheet material that ir disruptable to yield a sheet material having a layer that is disrupted, generally being the central part, and a surface layer on at least one side of the disrupted layer that is continuous.

SUMMARY OF THE INVENTION

The extruded sheet material according to my invention having a disrupted layer and a continuous surface layer on at least one surface comprises thin lamellae of a polymeric material, hereinafter called first polymeric material, said lamellae being arranged so that a portion of each is situated in a layer of the sheet where there are no connections or only disrupted connections to adjacent portions of the adjacent lamellae of the first polymeric material, whereas a substantial portion at least of the length of each of said lamellae forms part of said surface layer, said layer consisting at any point of a large number of film formed lamellae portions laying one upon the other in overlapping sandwich-like arrangement, adjacent lamellae portions on the surface layer being in intimate adherence with one another.

The sheet material according to my invention may furthermore contain lamellae of another polymeric material, hereinafter called the second polymeric material, extending across the disrupted layer of the sheet and in interspersed relationship with the lamellae of the first polymeric material, the lamellae of the second polymeric material forming zones of disruption between the lamellae of the first polymeric material. The continuous surface layer or surface layers must be devoid of this second polymeric material. The manner in which the second polymeric material forms zones of disruption can either be that the lamellae of the second polymeric material have in themselves a disrupted structure, or that these lamellae are at least in part disrupted from the lamellae of the first polymeric material, or both.

No matter whether or not the second polymeric material is desirable in the finished sheet material according to the invention, the latter is preferably introduced into the sheet in the form of lamellae during extrusion, to be removed later if it is not desirable. Alternatively a non-polymeric material of sufficiently high viscosity, such as a paste, can be introduced during extrusion in the place of the second polymeric material, but in any case the partial disruption of the extruded sheet material is based on the introduction of lamellae of a substance different from the first polymeric material. The choice of the components and disruption treatment or treatments must be so that the continuous structure of the surface layer or layers is left unaffected whereas the layer of the sheet containing lamellae of the second material is disrupted.

The extrusion of the composite sheet material may take place by feeding the first polymeric material, while fluid, to first orifices in a row comprising a multitude of orifices in an extruder device, and feeding a second fluid, extrudable material, to second orifices in the row, these second orifices alternating with the first orifices, the first orifices further extending out from the centre of the row in one or both directions than the second orifices, extruding the fluid materials through the orifices into a collecting chamber that extends along the length of the row and has an outlet slot extending along the length of the row, and while extruding said fluid materials through said collecting chamber and slot, subjecting the extruded sheet to a transverse smearing action. Disrupting of the continuous structure of a layer of the sheet material is carried out in either fluid, semifluid or solid state, while leaving the continuous structure of the surface layer or layers unaffected. The disruption may in certain cases occur during the formation of the sheet.

The transverse smearing out, by which the lamellae of the materials extruded are brought down to at least a relatively fine thickness, can be established by movement of the collecting chamber and the row of orifices relative to and along one another. In this case the collecting chamber should preferably narrow down immediately after the orifices preferably in a neck, i.e. very rapidly in order to enable a sufficient shear to be produced between the nozzle parts in the row and the walls of the collecting chamber. The extruded lamellae are hereby deflected from the forward direction and will continue their flow in a "broadside" manner. The "broadside" flow through the collecting chamber and the slot of its end will make the lamellae drag in the direction of extrusion, i.e. the sides of the lamellae will be dragged in relation to their central portion.

An alternative method of establishing the transverse smearing out is to move one side of the collecting chamber relative to and along the other. The sides of the lamellae will thereby be dragged in relation to each other. In this case it is less important for the collecting chamber to narrow down, and there may even be a long chamber zone, where no transverse shear occurs, between the row of orifices and the moved parts of the collecting chamber, since the nozzle parts need not partake in the smearing action in this case. However, it is also possible to combine the two methods.

The orifices for extrusion of a large number of lamellae side by side into the collection chamber are preferably closely spaced, elongated slots forming an angle with the row in which they are arranged.

It seems impossible to make the spacing between the extrusion orifices of the row closer than about 1 mm., and generally a spacing of 2-3 mm. is preferable for constructional reasons. If the extrusion velocities of the two polymeric materials are equal, the original thickness of the lamellae will equal the distance between the slots, however it is easy to obtain the desired small thickness of the lamellae by the dragging and shearing action described.

I use the term lamellae to signify any body in which one dimension is very much greater than one at least of its other dimensions, and in my final product at least one dimension is generally very much less than the other two dimensions.

Because of the described geometrical arrangement of the extrusion device the presence of the second material is avoided at least in one surface layer where the lamellae of the first material are allowed to fuse together. The choice of said second material with regard to the choice of disrupting process must be so that disruption occurs in and is confined to the layer or layers where the second material is present. The sandwich-like overlapping arrangement of the lamellae in the continuous surface layer or surface layers is a result of the dragging of the lamellae. It is preferable that the continuous surface layer or surface layers should consist of considerably more than two or three lamellae of the first polymeric material in order to acquire a suitable tensile strength. For example, there may be at least 10 and preferably 20, or even 50, or more, lamellae lying upon one another at any one place. The individual identity of each lamella in the surface layer may not always be easy to see since the lamellae will fuse together to form what often appears under low magnification, to be a single unit layer. Under high magnification with suitable dyeing or shading the separation of the lamellae will be visible however.

The conformation of the lamellae will depend upon the manner of forming the sheet material. If there is established a movement of the collecting chamber in its entirety and the row relative to and along each other, all the lamellae of the first polymeric material, because of the kind of drag described above, will become U-shaped, with the point of the U leading in the direction of extrusion. The central portion of the U purposely may be missing as will be explained in a following paragraph.

If one side of the collecting chamber is moved relative to the other as the lamellae are passing through it this will drag the sides of the latter with the effect that the lamellae of first polymeric material will be brought to lie substantially parallel to the plane of the sheet material. I call the shape of the lamellae, in the direction transverse to the length dimension of the lamellae, a flattened S in this instance. It is also possible to chop the lamellae into shorter lengths, before the final shear or dragging action in the extrusion device, and the discontinuous lamellae hereby will form rows of U or S profile in the extruded sheet material.

In many cases the preferred type of disruption is foaming of the polymeric material, so that the disrupted sheet material has a layer normally the core containing foamed polymeric material and has at least one unfoamed surface layer of the first polymeric material. Foaming may be caused during or after the haul-off of the sheet from the extrusion device. In the latter case the expansion agent must normally be introduced after the extrusion process, whereas in the former case the expansion agent may be present in the second material, when this is fed to the extruder or may be separately injected into the extruder for said component or into the extrusion device.

Other types of disruption that are embraced within the invention include cracking the first polymeric material into fibres. The cracking may sometimes not be sufficiently great to allow the cracked material to be considered to be in fibre form. Another type of disruption is that in which the lamellae of the interphases between the lamellae make slippage. All types of cracking may be promoted by including in the second polymeric material a slipping agent, for example an oil which is soluble in the fluid polymer but bleeds out on solidification of the latter. Cracking the second material or cracking the two sets of lamellae away from each other in the layer of the sheet to be disrupted can be done by drawing, rolling, impacting, bending or by acoustic or chemical action. Disruption may further consist in or involve removal of the second material so as by dissolving or brushing. Several of the above-mentioned disruption actions may be used in combination.

The shape of the lamellae will depend at least in part upon the proportion between the viscosities of the particular polymeric materials that are used as well as their deviations from Newtonian behaviour, and upon the movements and shape of the devices establishing drag and shear.

In general, polymeric materials of lower viscosity are more readily deflected from the linear path than materials of higher viscosity. It is therefore particularly preferable that the second polymeric material should have lower viscosity than the first, in order that it is more readily deflected, but anyway not very much lower, a proportion in the range of 2-10 between the said viscosities generally being advisable. Each of the small channels feeding the extrusion orifices preferably should neck at the place of the orifice in order to produce a relatively high pressure drop in the latter, thus increasing the possibilities for having different viscosities of the components.

By suitable asymmetric construction of the device for extrusion this process can be controlled so that a surface layer of the first polymeric material is only formed on one surface, only a small amount of flattening out of the lamellae of the first and second materials occurring on the other surface. For some purposes it is very desirable that one surface should be strongly bonded by a surface layer, and the other surface should be really open, and this can be achieved by cutting or grinding away one of the surfaces. A sheet material having a strong surface layer on each surface can be split down the middle to provide two sheet materials, the splitting being conducted by, for example, leather splitting machinery.

Alternatively each of the slots for the first polymeric material can be divided into two in such a manner that the sheet will acquire a layer of pure second material throughout its middle. The two half-parts can then be cracked apart, or the middle layer can be dissolved.

It is sometimes desirable to draw the lamellae in two steps while they are fluid. This may be achieved by supplying the collecting chamber with a large number of dividing walls after the neck so as to form in the collecting chamber a row of channels parallel to the row of extrusion orifices, and feeding the fluid lamellar material emerging from the channels into a second collecting chamber that also extends along the row. This second chamber preferably has a similar internal profile as the first and preferably also includes a neck leading to its slot. This chamber as well as the row of extrusion orifices by which the lamellae are originally formed are preferably stationary with respect to the row of slots, whereas the first collecting chamber is reciprocated or rotated.

In general, I prefer to extrude the lamellae through a circular row of slots, the collecting chamber then being a correspondingly circular collecting chamber. Preferably the collecting chamber and the row are rotated relative to one another, and so the U form is produced. It is possible, however, to rotate the two sides of the collecting chamber at different speeds (one of which may be zero) relative to the row of slots either in the same direction or in opposite directions in which event the lamellae will be a mixed form between the U and the S.

The product obtained on rotating the collecting chamber as a whole relative to the circular row of slots will have the lamellae arranged as a helice in the extruded tube. The pitch angle of the helice will depend on the relative speeds of rotation, but in case the lamellae are made continuous and the process takes place without any movement of the two parts of the collecting chamber relative to each other, the helices must necessarily become very flat in order to obtain a sufficiently small thickness of the lamellae in the core portion of the sheet material.

In case the die-lips from which the fluid sheet material is hauled off is rotated as a whole, the nip of the haul-off rollers must be constructed to rotate in similar manner. As an alternative to the rotation of the die-lips, the part of the device containing the row of extrusion orifices may be rotated, in which case the main channels feeding the extrusion orifices will have to be connected to the extruders through suitable concentric revolving fittings.

If the row of slots and collecting chamber are both linear the movement between the chamber and the slots, or between one side of the chamber and the slots has to be reciprocal, with the result that the lamellae will be folded back and forth upon themselves.

It is preferable that the lamellae of the first component are thin since they will be held together with strong surface forces sufficient to prevent them being pulled apart by longitudinal stretching of the sheet. In general, the lamellae of the first component at least should and can be less than 10 microns thickness throughout a substantial part of the continuous surface layer.

In order to increase the adhesion of the lamellae of the first component to one another in the surface layer it may be desirable to interpose, through a separate channel system and separate orifices, in the row of orifices, lamellae of a third polymeric material to which the first polymeric material will intimately adhere beetween adjacent lamellae of the first polymeric material at least where these lie substantially in the plane of the sheet material in the surface layer. Again, in order to increase the adhesion between the first and second polymeric materials it may be desirable to interpose lamellae of a fourth polymeric material between adjacent lamellae of first and second polymeric materials. These lamellae may if desired also extend out into the surface layer to increase the adhesion between adjacent lamellae of the first polymeric material in which case the fourth polymeric material will also serve a third polymeric material, as referred to above. Alternatively, different adhesive components may be used for the surface layer and the disrupted portion of the sheet.

It is to be understood that the terms "first polymeric material" and "second material" each can comprise several different materials each being extruded through a separate channel system and separate orifices of the row, provided the different polymeric materials forming the lamellae of the "first polymeric material" are capable of being and are actually intimately adhered to each other in the surface layer or layers either by direct bonding or through a suitable interposed adhesive component.

BRIEF DESCRIPTION OF THE INVENTION

Figure 2:
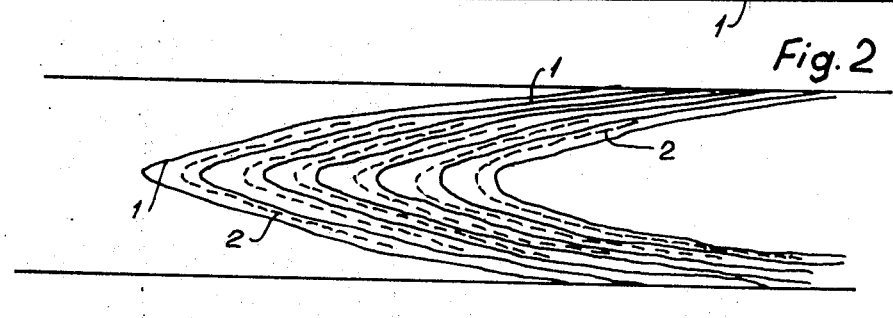
Figure 3:
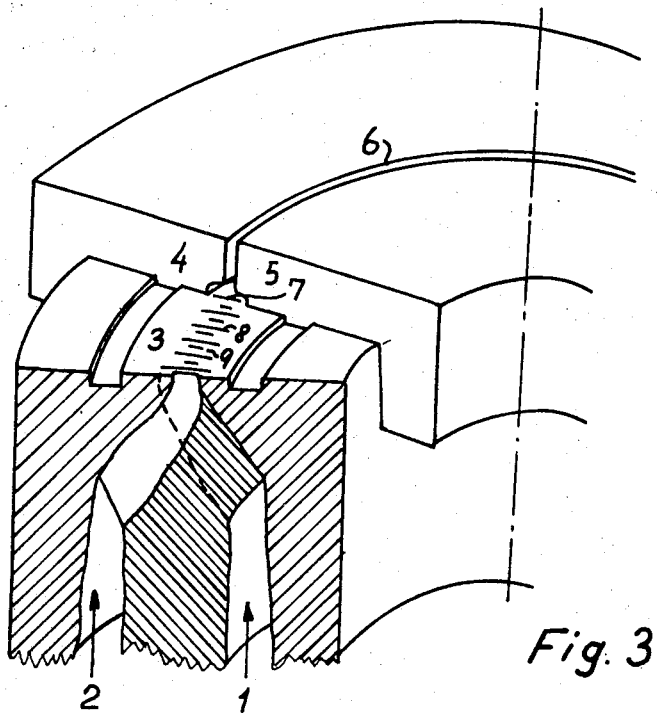
Figure 13:
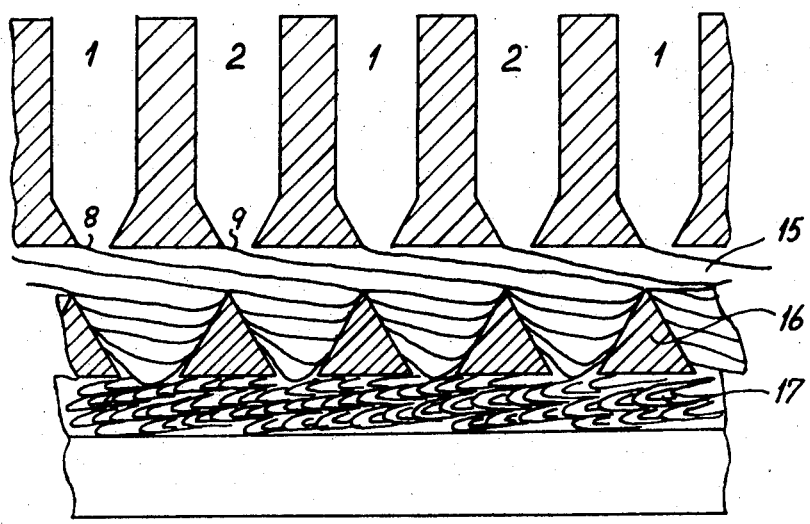
Figure 14:
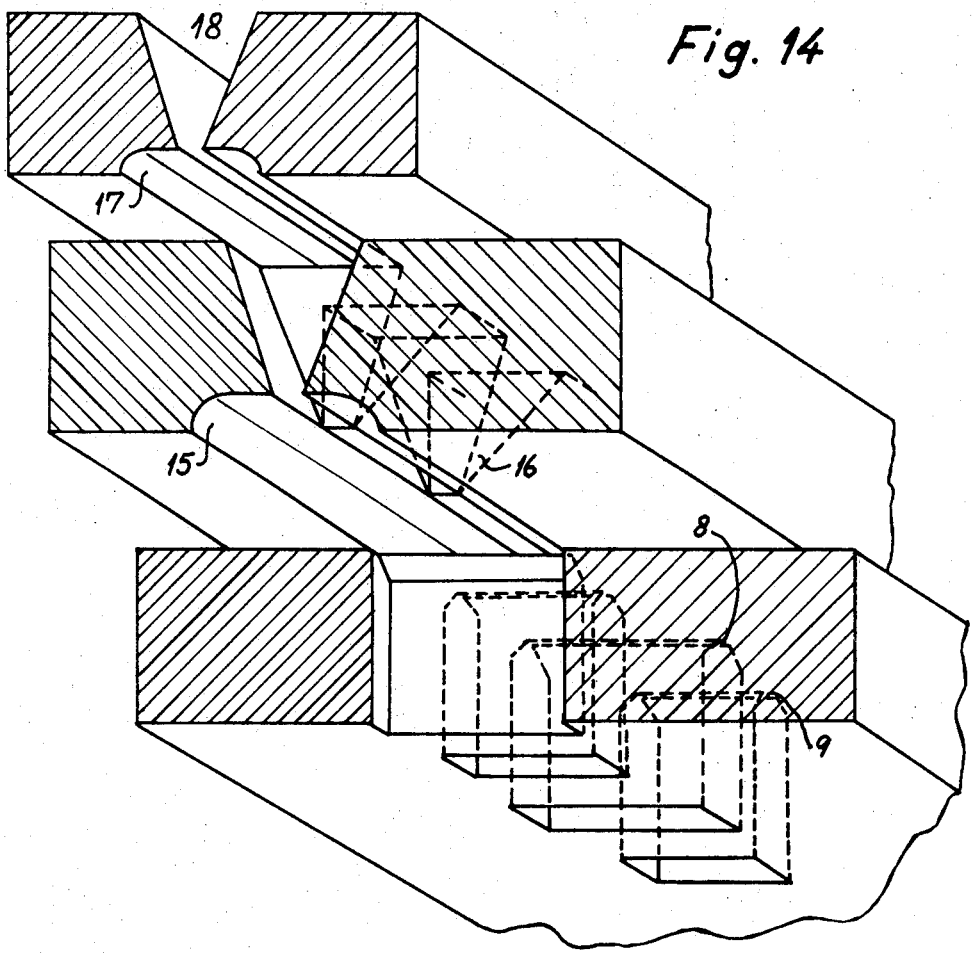

FIG. 1 is a section through sheet material capable of being disrupted to a product according to the invention and having lamellae of flattened S form, the section being transverse to the direction of extrusion of the material, FIG. 2 is a section of a sheet material capable of being disrupted to a product according to the invention having lamelae of U form, the section being taken in the direction of extrusion, FIG. 3 is a diagrammatic perspective view, partly in section, of a ring die comprising a collecting chamber with ring slot which may be used for the production of a sheet material having lamellae of either U or S form, FIG. 4 is a diagrammatic section transverse to the length of the collecting chamber shown in FIG. 3, FIG. 5 is a view from above of an apparatus shown in FIG. 3, FIG. 6 is a diagrammatic view from above of an apparatus as in FIG. 3, showing the drive and the emerging S-structure, FIGS. 7, 8 and 9 are each representations of slot arrangements that may be used, FIG. 10 is a perspective view of a disrupted wrapping material according to the invention, FIG. 11 is a cross-sectional view of the lamellae showing either, depending on the dimensions, a carpet type material or a film for sanitary purposes producing a textile feel on one of the surfaces, FIG. 12 is a cross-sectional view of the lamellae showing the structure after expansion of the second polymeric material, FIG. 13 is a diagram representing the two steps drawing and simultaneous chopping of the lamellae, and FIG. 14 is a diagrammatic perspective view partly in section of the die arrangement corresponding to FIG. 13.

In each of FIGS. 1, 2, 4 and 6 the sheet material is shown, for simplicity, as being made of solely two polymeric materials, lamellae 1 being of the first polymeric material and lamellae 2 being of the second material. For clarity, the lamellae are represented by lines, but in actual fact they have a course thickness corresponding to the spacing of the full and dotted lines. This thickness and the angles to the plane of the sheet are grossly exaggerated.

The sheet structures shown in FIGS. 1 and 2 are the pure flattened S and the pure V respectively. In practice, sheet material according to the invention may sometimes have a structure intermediate between the two, and thus the lamellae may be arranged in a spiral arrangement. The preferred form of sheet material for most purposes is that shown in FIG. 2. As shown in FIGS. 1 and 2 the sheets have a surface layer on each surface of the material formed solely by material 1, the lamellae 2 not extending into these surface layers.

The apparatus shown in FIG. 3 comprises a row of slots 3 above which is a collecting chamber consisting of parts 4 and 5 which are arranged to define an extrusion slot 6 and a neck 7. Polymeric material 1 is extruded through relatively long first slots 8 while polymeric material 2 is extruded through shorter second slots 9. The two parts of the collecting chamber may be rotated together relative to the row of slots so that the drag exerted by the bottom of the collecting chamber on the lamellae 1 and 2 as they are extruded from slots 8 and 9 causes the lamellae to be laid substantially flat along the row. Simultaneously, however, the lamellae are forced upwards by fresh polymeric material being extruded through the slots and as they are forced upwards their sides drag against the sides of the collecting chamber, as indicated in FIG. 4, and in particular against the neck 7, and the U-form of FIG. 2 results. The extruded product consists of shorter lamellae 2 separating the lamellae 1, these lamellae extending beyond the lamellae 2 so as to form a surface layer on each side of the sheet material.

However, as shown in FIG. 6, the two parts 4 and 5 of the collecting chamber may also be moved in opposite directions to exert a symmetrical drag on the two sides of the lamellae, whereby the S-form is produced. For this purpose, the reduction of thickness within the collecting chamber ought to take place less rapidly, and it is even possible to avoid said reduction. As is easily seen, mixed forms between the S and the U can also be produced by suitably selecting the relative and absolute speeds of the two parts 4 and 5.

In the row of slots shown in FIG. 7 long slots 8 for the first component are separated from shorter slots 9 for the second component by long slots 10 through which a third polymeric material is extruded to which the first and second polymeric materials will bond. Thus the surface skin of the sheet material will consist of lamellae of polymeric material 1 bonded to one another by lamellae of the bonding polymeric material. In the row of slots shown in FIG. 8 every long slot 10, for the first polymeric material, is separated from the adjacent short slot 11, for the second polymeric material, by a short slot 13 for a polymeric material that will increase adhesion between the first and second polymeric materials. In the row of slots shown in FIG. 9 the slots 8 for the first component do not extend across the central portion of the area of the row. Consequently, the lamellae of the first polymeric material will not extend through the central layer of the sheet and the central portion of the U-shape of the lamellae 1 will therefore be missing. Such a structure will be referred to as a split U structure. Owing to the absence of material 1 in the central layer, the sheet may therefore easily be split into two halves along its median plane.

Other combinations of slots of different lengths may be used.

A disadvantage of most wrapping films of polymeric material is that they are normally impermeable and they can only be rendered permeable by punching holes through them, and this makes them too permeable. A preferred packaging material according to the invention is shown in FIG. 10. In this material holes 12 are punched through the surface layer made up of the flat portions of a large number of U-shaped lamellae and which form the upper surface of the sheet material while holes 13 are punched through the lower surface. As is seen, the holes 13 are located at a position removed from the closest hole 12 along the length of the lamella 14. A material of the type illustrated generally is sufficiently impermeable to prevent entry of water but vapour can pass through it by passage through a hole 12, migration along the disrupted centre between adjacent lamellae and out of the next hole 13.

It is often desirable that the first polymeric material should be crystalline and orientable. Orienting is provided by stretching in solid state and may simultanoeusly produce the desired disruption in the central layer.

Sheet material according to the invention can be laminated to one another and, if the surface layers have been uniaxially oriented or biaxially oriented with one direction predominant it is preferable that the directions of orientation should cros one another.

The invention can furthermore be used to produce crystalline, oriented wrapping material in which the disrupted portion forms the major part by volume but the minor part by weight. For this purpose lamellae of U-profile are preferably applied. The object of this product is to form a film of high tensile strength combined with improved protection against impacting and facilitated handling even when the film is relatively light, e.g. 40 grams per sq. m.—200 grams per sq. m. As an example the first polymeric material in this case can be high density polyethylene without any expansion agent and the second polymeric material can be polyethylene with an expansion agent.

In FIG. 11 the invention is used to produce a kind of pile on a sheet or film on basis of lamellae having U-profile or on basis of a profile which already in the extrusion device has been a split U. For this purpose the second material is either removed or cracked, generally to fibers. Dependent on the square meter weight produced and the thickness of the lamellae in the pile, such material can either be used as for sanitary film, and similar purposes, or be used as carpet material.

In order to make the fineness of the pile sufficient for such sanitary purposes as well as for finer carpet applications it is preferable to use a two steps dragging of the lamellae in the extrusion device, such as diagrammatically shown in FIG. 14.

Furthermore, the invention is very advantageous for production of expanded boards, when tensile strength, breaking strength or abrasion resistance is particularly desirable. FIG. 11 shows the structure in this case, the U profile of the lamellae being applied in order to obtain the best stiffness, and an adhesive layer being formed by a "fourth material" to bond the expanded material to the lamellae which form a reinforcement. As an example, the combination of polystyrene with reinforcement lamellae of polyethylene (preferably but not necessarily the high-density type) is very useful. The adhesive material may in this case consist, for instance, of graft- or block copolymers of ethylene and styrene or may simply be an intimate mixture of polyethylene and polystyrene, preferably both of relatively high weight in order to reduce the tendency for cracking to occur in the adhesive layer.

As explained above, the principle of cross-lamination can be applied on oriented material with respect to the main directions of orientation. However, the principle of cross-lamination furthermore can be applied with respect to the directions of the rows of lamellae even in molecularly unoriented material, in order to produce a more balanced stiffness in different directions. This is particularly useful when applied to the expanded material, so as e.g. the type described in the preceding paragraph using polyethylene and expanded polystyrene in combination. The expanded boards as described above, are useful for many constructional purposes, such as light walls in the building trade, and boxes, cases and drums in the packaging industry. The thickness may, dependent on the many different purposes, vary between e.g. 0.2 mm. and 50 mm.

When lamellae of U form or split U form are to be produced in a thickness which even at the middle section of the sheet must be very fine, the arrangement shown in FIG. 3 is unpractical, as extreme high rotation speeds will be required for obtaining such fineness. In the modification shown in FIGS. 13 and 14, however, the lateral dragging of the lamellae to form the U shape (or the split U shape, in case the extrusion slots for the first polymeric component is split, as shown in FIG. 9) takes place in two steps with the result that the fineness can be extremely high, even in the core part of the sheet, and with the further result that the lamellae are chopped simultaneously with the dragging to form continuous rows of discontinuous lamellae. From the extrusion slots 8 and 9 the polymeric materials 1 and 2 merge into the reciprocating collecting chamber 15 (the method may also be carried out in rotating arrangement) while being dragged to semi-fine continuous lamellae which advance through the collecting chamber almost in a "broadside" manner. The neck of the collecting chamber continues in a row of channels formed by the dividing walls 16. The latter have wedge shape as shown, so that their rear ends form a kind of second extrusion nozzles arranged in a row. Hereafter follows a second collecting chamber 17 having a similar neck but continuing in a slot 18. The continuous lamellae are chopped by the walls 16 and during the passage through the channels change from almost broadsiding to almost being directed longitudinally, so that they emerge in bunches from each of the channels. Each bunch is further dragged due to the movement between the walls 16 and the second collecting chamber 17 and will form a row in the extruded sheet.

In the slot 18 the chamber may widen smoothly in order to make the material thicker if desired and raise the central portion of the U. For this purpose it may be advantageous to apply cooling to the second collecting chamber, e.g. by means of a cooling medium applied through channels in the surrounding walls.

The invention can, in fact, be carried out with any extrudable polymer material as first polymer material. Said material can be either crystalline or amorphous in its solid state, and furthermore fully synthetic as well as semi-synthetic or even natural, extrudable polymer substances are applicable. In some cases it may be advantageous to use a prepolymer substance which is cured after the extrusion, so as for example a suitable polyisocyanate/polyol mixture.

What I claim is:

1. An extruded sheet material comprising thin, substantially parallel lamellae of a polymeric material extending across the sheet thickness generally at an angle to the plane of the sheet, the marginal portions of said lamellae adjacent at least one surface of the sheet being disposed in overlying, overlapping sandwich-like arrangement in intimately coherent relation to form on said surface a continuous layer comprised of said polymer, other portions of said lamellae internally of such sheet surface having their adjacent surfaces maintained substantially free of mutually adhering contact.

2. The extruded sheet material of claim 1 wherein said internal portions of said lamellae are maintained substantially out of mutually adhering contact by intervening thin lamellae of a second polymeric material interspersed with said first-mentioned lamellae, said continuous surface layer being free of said second polymeric material.

3. A sheet material according to claim 2, in which the lamellae of the second polymeric material are discontinuous in structure.

4. A sheet material according to claim 1, in which the surfaces of the lamellae of the second polymeric material are at least partially separated from the adjacent surfaces of the lamellae of the first polymeric material.

5. A sheet material according to claim 1, in which the lamellae of said polymeric material are curved in generally U-shaped cross sectional configuration.

6. A sheet material according to claim 2, in which the lamellae of the first polymeric material are interrupted across the sheet thickness, said interruptions being arranged in registration substantially throughout the sheet.

7. A sheet material according to claim 1, in which the lamellae of the first polymeric material extend substantially continuously across the sheet thickness.

8. A sheet material according to claim 2 wherein the marginal portions of said first-mentioned lamellae are held together in intimate coherent relation by means of thin lamellae of a third polymeric material adapted to adhere to said first polymeric material, said latter lamellae being interposed between said first lamellae in at least the marginal portions thereof.

9. A sheet material according to claim 8 including lamellae of a fourth polymeric material to which the lamellae of the first and second polymeric materials intimately adhere, the lamellae of the fourth polymeric material being interposed between adjacent portions of the lamellae of the first and second polymeric materials.

10. A sheet material according to claim 2, in which the second polymeric material is a foamed polymeric material.

11. A sheet material according to claim 2, in which the second polymeric material is disrupted into a fibre-like array.

12. A sheet material according to claim 2, in which the first polymeric material is crystalline and oriented.

13. A sheet material according to claim 3, in which the marginal portions of said lamellae adjacent both surfaces of the sheet are disposed in said overlying, overlapping sandwich-like arrangement in intimate coherent relation to form continuous layers comprised of said polymer on both surfaces of the sheet and wherein holes extend partially through the sheet material from both surfaces thereof, the holes in one surface being offset from the holes in the other surface and occurring at spaced points along the length of the sheet material.

14. A laminate of a plurality of sheet materials according to claim 6, in which the lengthwise direction of the interrupted lamellae of the respective materials are arranged at an angle relative to one another.

15. A stiff board material for packaging or constructional purposes according to claim 10, the first polymeric material being polyethylene and the second polymeric material being expanded polystyrene.

16. A stiff board material for packaging or constructional purposes according to claim 14, the first polymeric material being polyethylene and the second polymeric material being expanded polystyrene.

17. A flexible sheet having a textile feel at one surface and a smooth continuous skin at the other surface and constructed according to claim 1 in which one of its surfaces is constituted by the free edges of the portions of said lamellae maintained substantially free of mutually adhering contact, the other surface being formed by the continuous surface layer of intimately coherent lamellae.

18. A wrapping film material consisting of a laminate of a plurality of sheet materials according to claim 12, of which at least two have different predominant directions of orientation for the lamellae of the first polymeric material.

References Cited
UNITED STATES PATENTS

| | | | |
|---|---|---|---|
| 3,295,552 | 1/1967 | Powell et al. | 264—171X |
| 3,420,267 | 1/1969 | Veazey | 264—171X |
| 3,461,197 | 8/1969 | Lemelson | 264—172 |
| 3,234,313 | 2/1966 | Miller et al. | |

WILLIAM J. VAN BALEN, Primary Examiner

R. O. LINKER, JR., Assistant Examiner

U.S. Cl. X.R.

161—160, 164, 168, 169; 264—176